United States Patent
Auternaud et al.

Patent Number: 5,086,541
Date of Patent: Feb. 11, 1992

[54] SELF-MOTORIZED ANTIFRICTION JOINT AND AN ARTICULATED ASSEMBLY, SUCH AS A SATELLITE SOLAR PANEL, EQUIPPED WITH SUCH JOINTS

[75] Inventors: Jacques Auternaud, Mougins; Jean Bartevian, Cannes la Bocca; Philippe Bertheux, Les Adrets; Eric Blanc, Le Cannet; Thierry de Mollerat du Jeu, Villeneuve Loubet; Jean Foucras, Mougins; Michel Louis, Nice; Georges Marello, Mandelieu; Pierre Poveda, Le Cannet Rocheville; Christian Roux, Mandelieu, all of France

[73] Assignee: Aerospatiale Societe Nationale Industrielle, Paris, France

[21] Appl. No.: 387,956

[22] Filed: Jul. 31, 1989

[30] Foreign Application Priority Data

Aug. 8, 1988 [FR] France .................. 88 10695

[51] Int. Cl.$^5$ .................................. E05D 1/06
[52] U.S. Cl. .............................. 16/227; 16/373
[58] Field of Search ............ 16/222, 225, 226, 297, 16/343, 227, 373

[56] References Cited

U.S. PATENT DOCUMENTS

| | | |
|---|---|---|
| 3,386,128 | 6/1968 | Vyryan . |
| 3,695,330 | 10/1972 | Hasbrouck .................. 16/225 |
| 3,945,053 | 3/1976 | Hillberry . |
| 4,619,304 | 10/1986 | Smith ........................... 16/227 |
| 4,843,679 | 7/1989 | Maidment et al. ........... 16/227 |

FOREIGN PATENT DOCUMENTS

| | | |
|---|---|---|
| 1030268 | 6/1953 | France .................. 16/225 |
| 2367578 | 10/1977 | France . |
| 2189290 | 10/1987 | United Kingdom . |

OTHER PUBLICATIONS

WO-A-8 302 795 Patent Cooperation Treaty (Courier display System Ltd), 8/1983.

*Primary Examiner*—Kurt Rowan
*Assistant Examiner*—James Miner
*Attorney, Agent, or Firm*—Pearne, Gordon, McCoy & Granger

[57] ABSTRACT

In order to connect two adjacent elements (E1,E2) joined, for example, onto a satellite solar panel, an antifriction joint (10) is used. The deployment kinematics of the joint enable deployment to be done extremely accurately. The joint comprises two braces (12,14) suitable for rolling one onto the other by two cylindrical surfaces (12a,14a). Guiding of rolling is ensured by two flexible members, such as rolling plates (16,28) extremities are secured to the braces and which pass by crossing between the cylindrical surfaces (12a,14a). A traction prestressing stored in the plates avoids any stray movement between the braces, especially at the time of deployment. The drive torque ensuring the automatic deployment of the joint and its end-of-travel locking are ensured by elastic bands (36) connecting the two braces and each formed of two superimposed plates. Successive joints may be joined using a synchronization deployment mechanism.

22 Claims, 7 Drawing Sheets

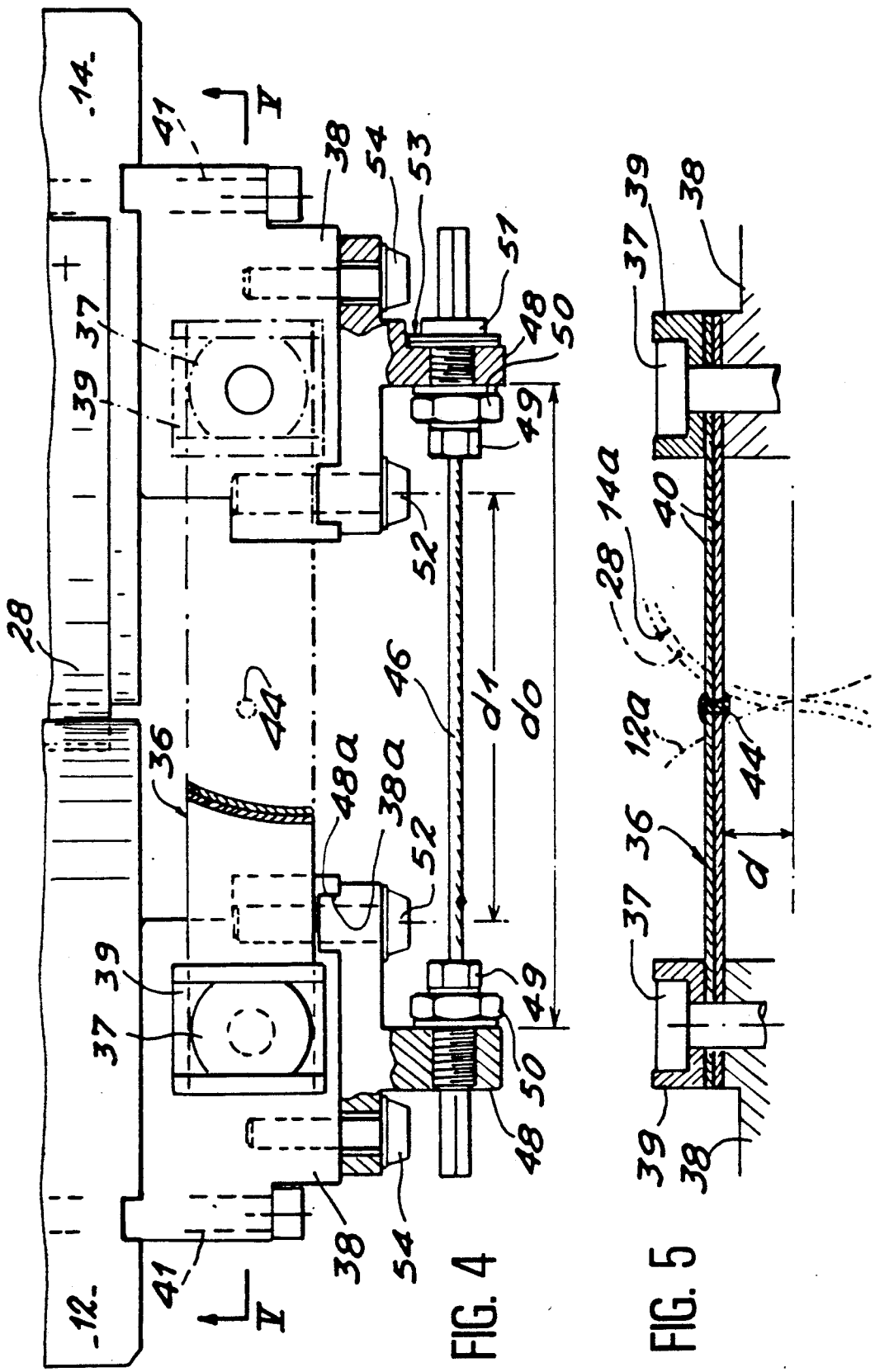

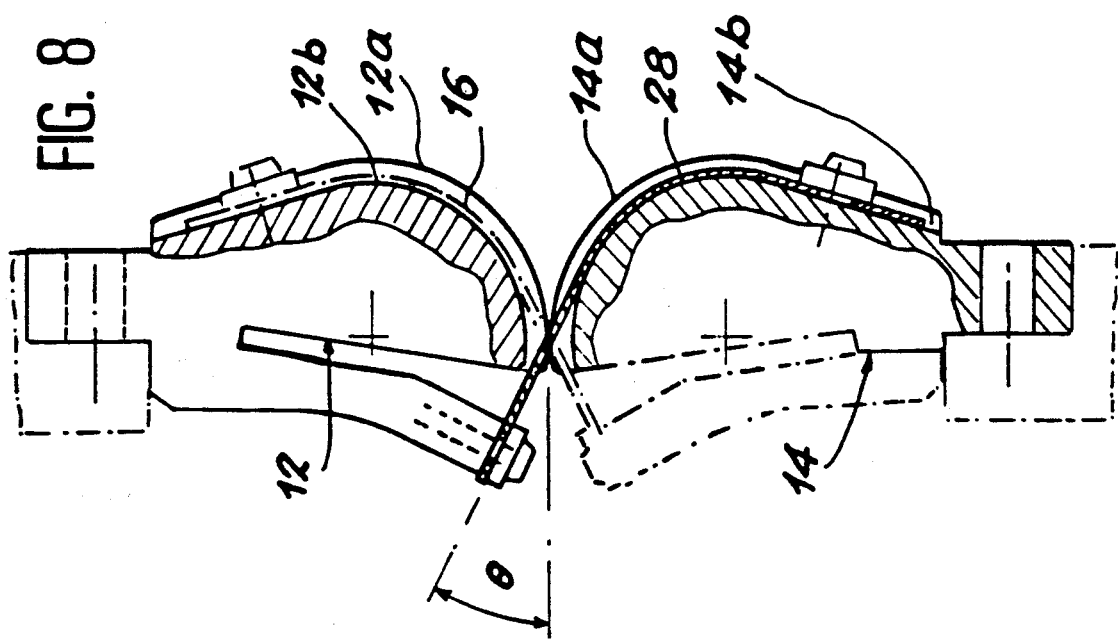
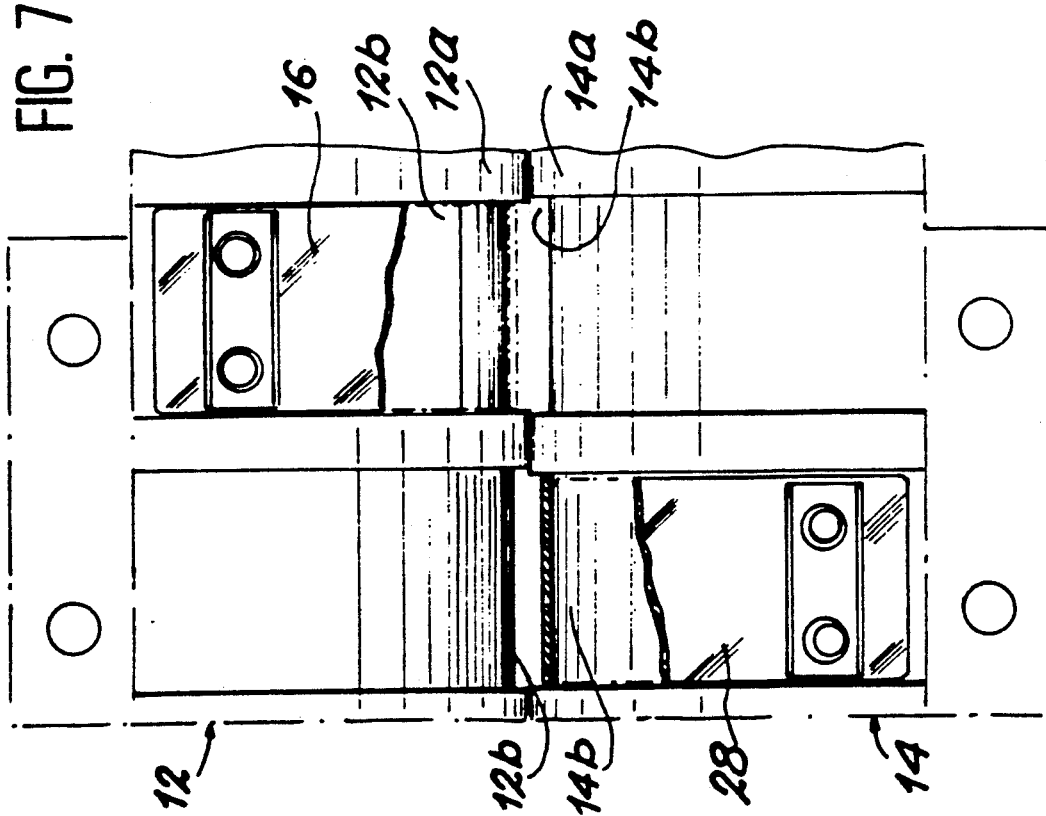

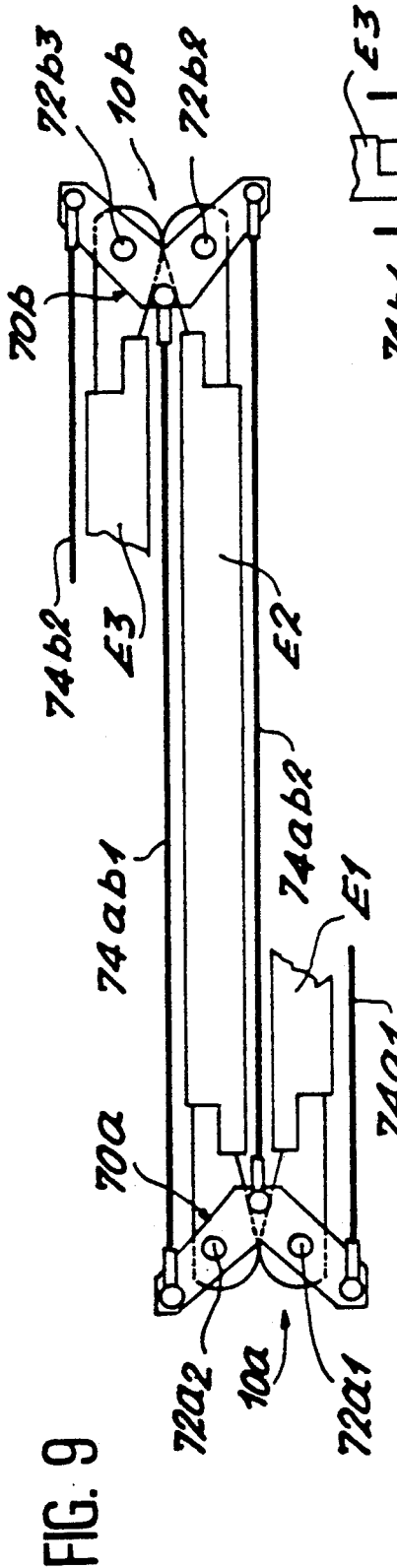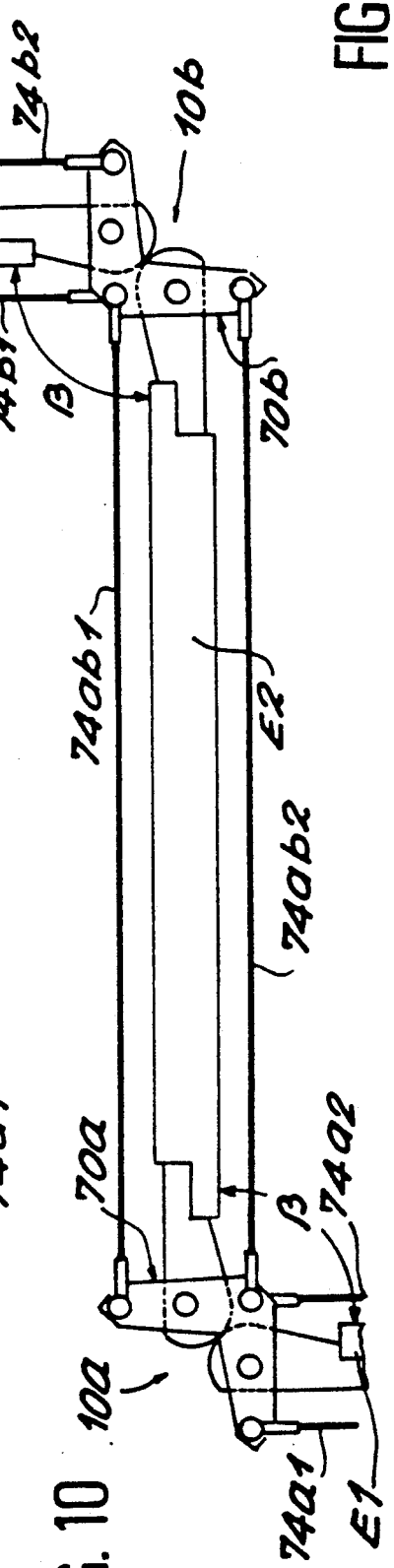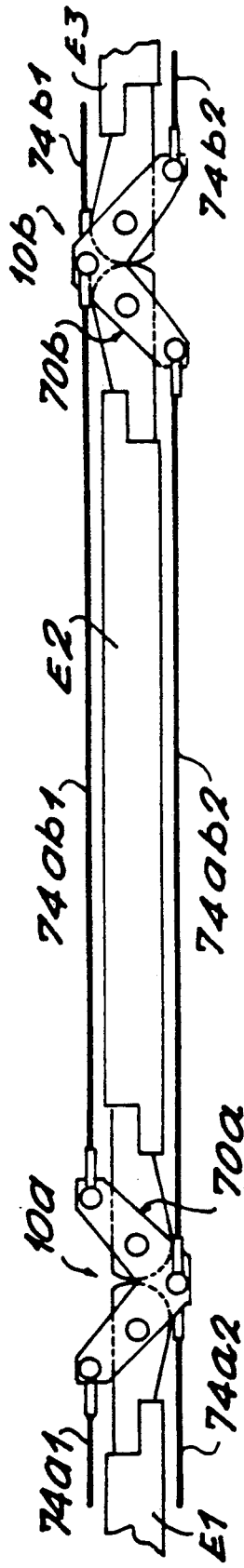

SELF-MOTORIZED ANTIFRICTION JOINT AND AN ARTICULATED ASSEMBLY, SUCH AS A SATELLITE SOLAR PANEL, EQUIPPED WITH SUCH JOINTS

FIELD OF THE INVENTION

The invention mainly concerns an antifriction joint designed to ensure both the automatic deployment of the elements it connects and the locking of these elements in a deployed position. The invention also concerns an articulated unit made up of various elements interconnected by such joints.

BACKGROUND OF THE INVENTION

Owing to its reliability and performances, the joint according to the invention is particularly adapted so as be able to be used in spatial applications and in particular in the production of the solar panels of satellites formed of various elements joined together and whose deployment occurs in space. However, a large number of applications are possible, both in space and on Earth. As regards the first category, one could mention mobile flaps, manipulator arms, etc., as simple examples. As regards land applications, such examples include uses in robotics and, for example, in the nuclear, food, pharmaceutical and chemical industries.

Currently, the various elements constituting articulated solar panels are usually interconnected by hinge-type joints characterized by rubbings occuring i.e., friction induced, between the parts in contact and moving in relation to each other. Such joints need to be lubricated, this proving to be extremely difficult to obtain having regard to the extreme temperature and vacuum conditions to which the satellite is subjected at the time the latter is launched and once it is placed in orbit in space. In these conditions, the materials have a tendency to naturally weld together or get stuck together, which risks resulting in the non-deployment of the panel.

In addition, current joints usually ensure deployment of panels by means of motorization or propulsion including, for example, torsional springs. The extensive and scattered rubbings or friction of these joints requires the need to have sufficient strength of propulsion so as to obtain an adequate propulsion margin. Should friction be insignificant, the end of deployment impacts may therefore be considerable. In order to limit these impacts, which would result in a significant structural impact, a speed adjustment system is added to these current joints. Moreover, any extensive scattered friction thus means that deployment geometry cannot be accurately predicted, it then being necessary to synchronize deployment of the various elements constituting the panels, as illustrated in particular by the document FR-A-2 371 343.

The document U.S. Pat. No. 3,386,128 considers the case of connecting two articulated elements by means of several spring rods with an arc of a circle section, said rods being secured to the two faces opposite these elements. Thus, an antifriction joint is embodied, said joint applying between the elements a drive torque tending to automatically deploy said elements and exerting a locking pressure between the latter when in the deployed position.

However, this joint does not provide any relative guidance between the elements when deployed, so that stray movements, such as torsional or oscillation movements, may occur when, for example, the satellite is launched, when the panel is deployed or under the effect of any thermal gradients to which the satellite is subjected. Such movements are not acceptable in practice, as they may possibly damage the panels themselves or other parts of the satellite.

Furthermore, the spring rods described in the document U.S. Pat. No. 3,386,128 have of necessity a limited thickness so as to guarantee good elasticity during all the deployment phase. Thus, to obtain a high drive torque with satisfactory locking pressure requires that a large number of plates be provided, which results in exaggeratedly increasing the spatial requirement of the joint.

Secondly, the document FR-A-2 122 087 refers to a hinge in which the two adjacent articulated elements are in contact with each other via convex cylindrical surfaces. These two elements are connected by at least two flexible strips whose extremities are secured to each of the elements, so that the strips cross between the cylindrical surfaces.

Such a hinge, which is also an antifriction hinge, does not comprise any propulsion or locking device in the opening position. Furthermore, it is not suitable for the aforesaid applications, as the thermal gradients to which it would then be subjected would inevitably lead to the appearance of play between the elements, resulting in undesirable torsional effects between the panels owing in particular to the stresses borne at the time the satellite is launched and at the end of deploying the articulated elements.

SUMMARY OF THE INVENTION

The object of the invention is thus to provide a new type of antifriction joint having both the advantages of the joints described in the documents U.S. Pat. No. 3,386,128 and FR-A-2 122 087 without containing the above-mentioned drawbacks, this joint in particular having the advantages of being self-motorized and self-lockable, while benefiting from guidance without play and torsional movement between the elements, irrespective of the temperature conditions and mechanical impacts to which the joint is subjected.

According to the invention, this result is obtained by using an antifriction joint designed to be mounted between two adjacent elements and comprising at least one preformed elastic band having a circular arc-shaped cross section, said joint being integral with each of the elements via its two ends and being characterized by the fact that it includes two braces suitable for being made integral with each of the elements and on which secured are the ends of each elastic band, said braces comprising convex cylindrical surfaces suitable for rolling onto each other under the action of at least two flexible members, the ends of each of these members being respectively secured to each of the braces so that these members pass by crossing between said cylindrical surfaces, a tensioning device being provided so as to exert a traction prestressing on each of said members.

In a joint designed as above, the two braces roll onto each other without friction under the action of elastic bands which also ensure locking of the joint deployed. Rolling is effected without play and any torsional movement between the panels by virtue of the prestressed flexible members connecting the two braces, this prestressing being determined so as to have said members support all types of load and the thermal gradients to which the joint in the envisaged application is subjected.

In addition to ensuring the above-mentioned aspects, the joint according to the invention has the advantage, given the absence of any friction, of ensuring that residual propulsion (drive torque less resistant torque) is slightly dispersed. Accordingly, the deployment geometry can be predicted extremely accurately. Thus, it is generally not necessary to add to it a synchronization system for deployment of the various panels. Furthermore, the absence of friction makes it possible to use relatively slight propulsion and thus limit end of deployment impacts. Therefore, it is not necessary to add a speed adjustment system to the joint.

Advantageously, each elastic band includes two superimposed spring rods rendered integral in their environment via a mechanical link device, such as a rivet.

So as to find the best possible compromise between the drive torque and the end of deployment locking pressure, each elastic band is preferably disposed at a positive distance from a plane passing through the axes of the cylindrical surfaces parallel to this plane and from the side orientated towards the inside of the joint, a concave face of said elastic band being orientated towards this plane.

In one preferred embodiment of the invention, the tensioning of each of the flexible members, constituted for example by a plate, is ensured by securing one end of this member to one of the braces by means of a bending beam. So as to avoid the plastic deformation of this beam, a shim can be inserted between its end linked to said device and an adjacent face of the brace.

Preferably, at least one elastic band is secured to at least one of the sides of the braces by means of anchorage parts mounted on the opposite faces of the braces.

In a large number of cases, the joint thus equipped functions satisfactorily. However, when the joint is deployed, its rigidity as regards closing (before any bending of the elastic bands) is insufficient in certain applications, having regard to the stresses applied on this joint. The braces then tend to move away from each other.

Three different embodiment variants of the joint according to the invention make it possible to resolve this problem.

According to a first variant, rigidity of the assembly deployed is ensured by means of at least one linking member, preferably prestressed, such as a cable secured to the braces, preferably by means of parts for anchoring the elastic bands so as to plate the cylindrical surfaces against each other. This linking member is then disposed roughly inside a plane passing through the axes of these surfaces.

According to a second variant, which ensures rigidity of the assembly without preventing the braces from separating, additional hooking members, including, for example, a hook connected to one of the braces by a spring plate and a slug integral with the other brace, are nested inside each other once the joint has been deployed.

Finally, in a third variant, the flexible members are mounted in throats formed in the cylindrical surfaces and whose depth is greater than the thickness of these members, so that the cylindrical surfaces are directly in contact with each other on both sides of the throats. This variant, particularly advantageous as it does not require any additional member in the joint, also ensures rigidity of the assembly without preventing the braces from separating.

As seen above, the joint according to the invention does not in principle require a system making it possible to synchronize deployment of the elements. Such a synchronization may, however, be useful in certain particular applications.

In this case, an articulated assembly, formed of at least three adjacent elements joined two-by-two by at least one joint according to the invention, is characterized by the fact that in addition it includes a synchronized deployment mechanism comprising between each pair of adjacent elements a support joined onto these elements by spindles merged with the axes of the cylindrical surfaces of the joint connecting these elements and, for each element situated between two joints, a pair of traction members joined onto the supports on both sides of their hinge pins on this element so as to form deformable parallelograms with these supports.

BRIEF DESCRIPTION OF THE DRAWINGS

Various variants for embodying a joint according to the invention and an articulated assembly equipped with such joints are described as follows by way of examples, in no way restrictive, with reference to the accompanying drawings in which:

FIG. 4 is a plane view representing on larger scale the fixing of an elastic band and a prestressed cable on the braces of the joint;

FIG. 5 is a partial cutaway view along the line V—V of FIG. 4;

FIG. 7 is a plane view representing the central section of a joint in the deployed position and viewed from the internal side according to a further embodiment variant of the invention;

FIG. 8 is a cross sectional view of the joint of FIG. 7 in the deployed position and;

FIGS. 9 to 11 are side views diagrammatically representing one section of an articulated assembly formed of elements connected by joints according to the invention, this assembly being equipped with a synchronized deployment mechanism and successively represented in the folded back position, during opening and in the deployed position.

DETAILED DESCRIPTION OF THE PREFERRED EMBODIMENTS

Figure 1:
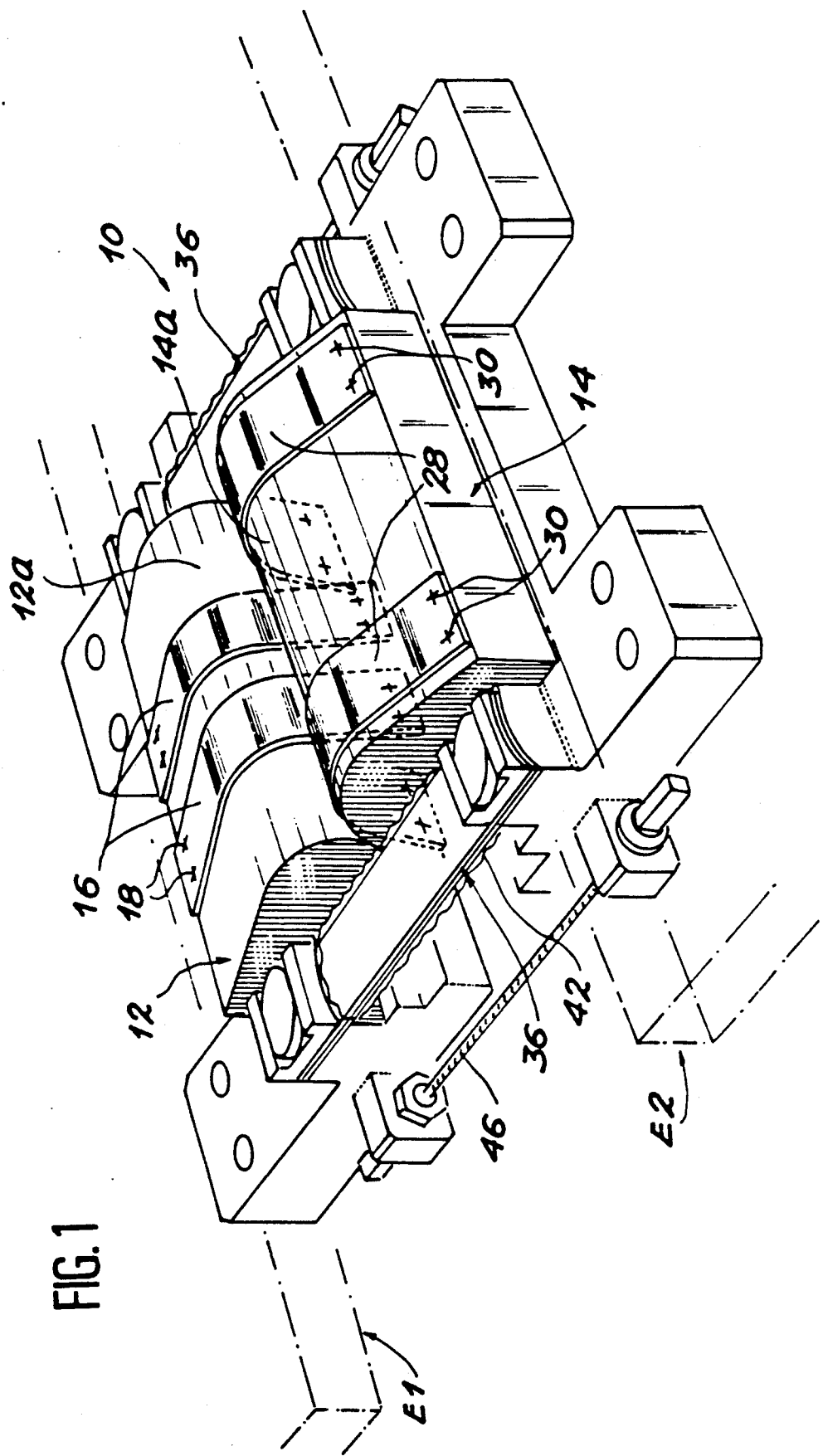
FIG. 1 is a perspective view representing the inside of a joint according to the invention in its deployed position.
Figure 2:
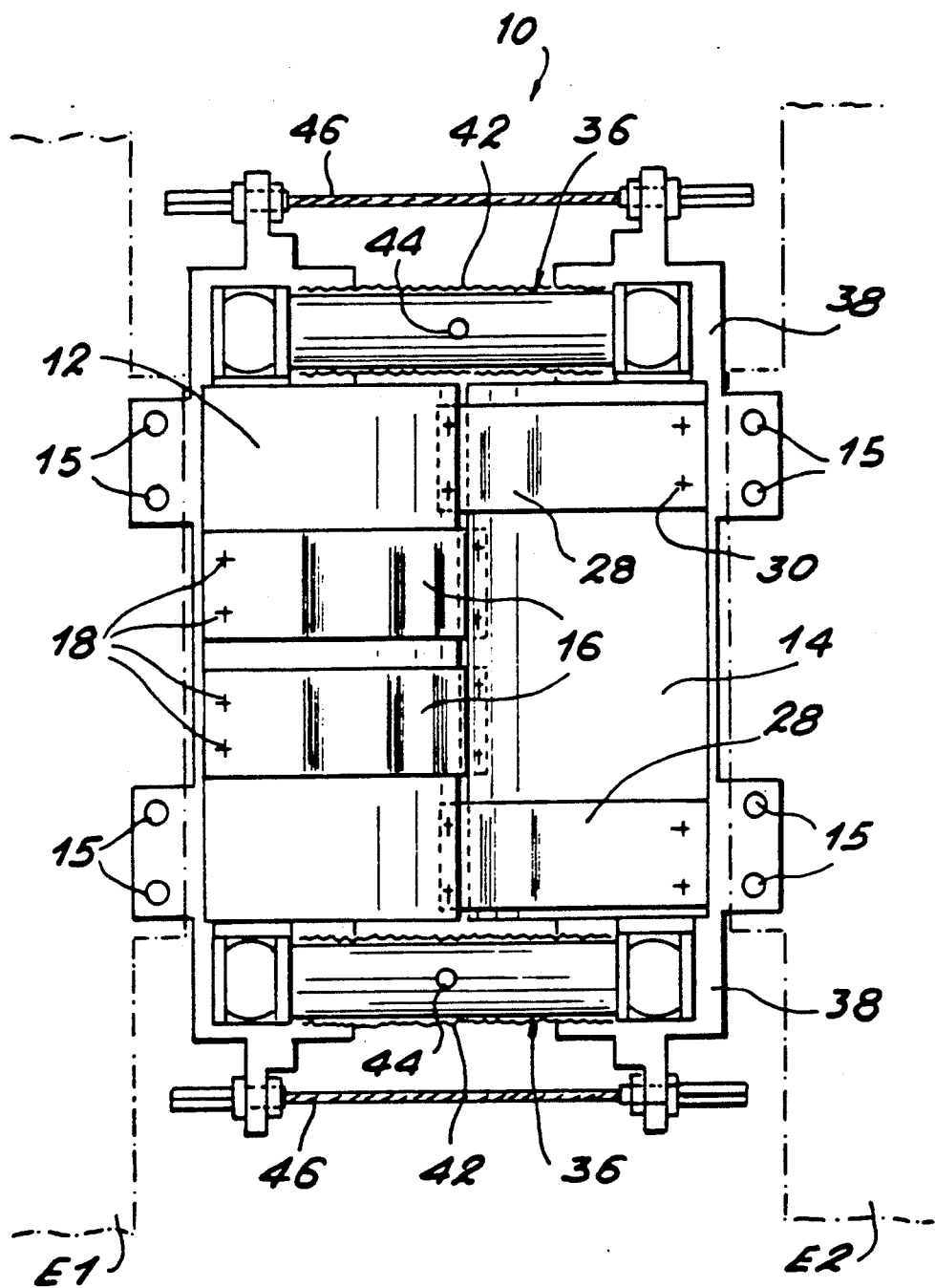
FIG. 2 is a plane view of the joint of FIG. 1 in the deployed position and viewed from the internal side.

As illustrated in particular on FIGS. 1 to 3, the joint according to the invention, generally denoted by the reference 10, comprises two braces 12 and 14 constituted, for example, by machined metallic blocks. These braces 12 and 14 are possibly lightened by recesses when justified by the application in question, such as in particular in space applications. Each of the braces 12 and 14 is provided so as to be secured to a corresponding element E1, E2 by any suitable means, such as screws or rivets 15 (FIG. 2).

The braces 12 and 14 each comprise a cylindrical surface 12a, 14a having as a section the shape of an arc of a circle whose length is slightly more than 90° in the example represented. The radii of the cylindrical surfaces 12a and 14a are equal. Thus, these surfaces 12a and 14a are suitable for rolling onto each other so as to enable the elements E1 and E2 to move between two extreme positions offset by 90° with respect to each other. When the elements E1 and E2 are flat elements, the first of these positions, namely the folded back position, corresponds to the case where the elements E1 and E2 are folded back against each other and parallel to each other, whereas the second position, namely the deployed position, correspond to the case where these elements are open and disposed inside the same plane.

So as to continuously guide the cylindrical surfaces 12a and 14a of the braces at the time they roll against each other, the joint 10 in addition includes flexible members whose ends are secured to each of the braces so as to roll on the surfaces 12a and 14a.

In the embodiment example represented on the figures, these members appear in the form of four flexible metallic plates 16 and 28 made, for example, of stainless steel and known as winding or control plates, as they make it possible to ensure guiding of the rolling movement between the surfaces 12a and 14a.

By way of example, the assembly 10 includes two adjacent central winding plates 16 disposed in the central section of the braces 12 and 14 and wound in the same direction on the cylindrical surfaces 12a and 14a on both sides of a median plane common to these braces. A first end of each of the winding plates 16 is directly secured to a flat surface of the brace 12 extending the cylindrical surface 12a tangentially to the latter. This fixing is provided, for example, by screws 18. From this end, the plates 16 pass between the cylindrical surfaces 12a and 14a of the braces so as to be successively in contact with the surface 12a and then with the surface 14a. A movement of the joint in the deployment direction thus has the effect of unwinding a certain length of the plates 16 from the surface 14a and unwinding this same length of the plates 16 on the surface 12a.

Figure 3C:
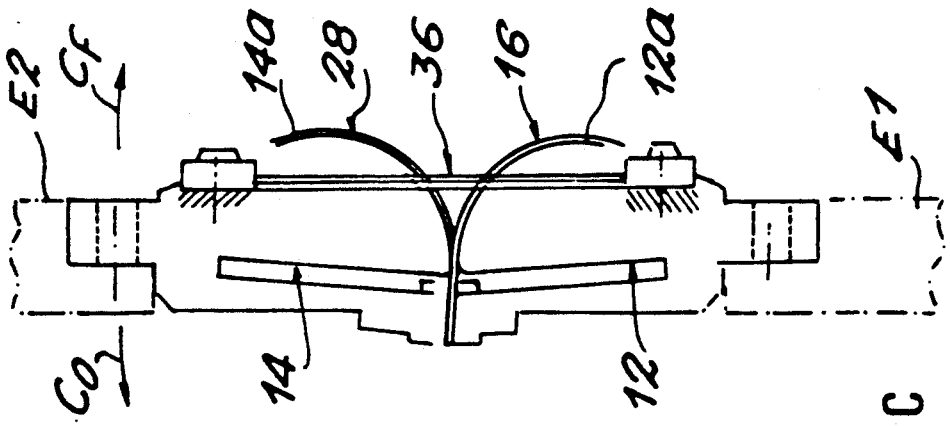
FIGS. 3a, 3b and 3c are, respectively in a folded back position, during deployment and in the deployed position, cross sectional views of the joint of FIGS. 1 and 2.
Figure 3B:
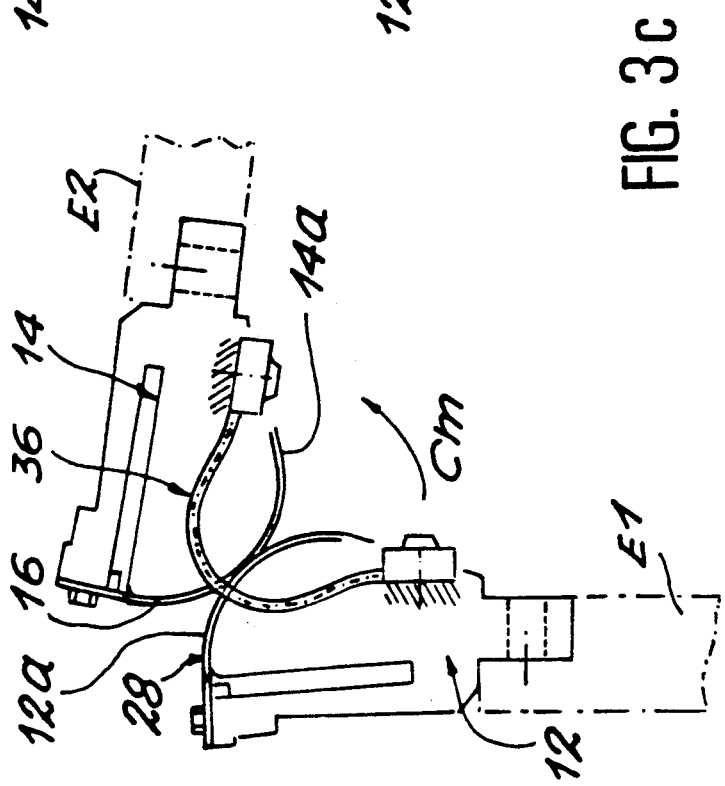
Figure 3A:
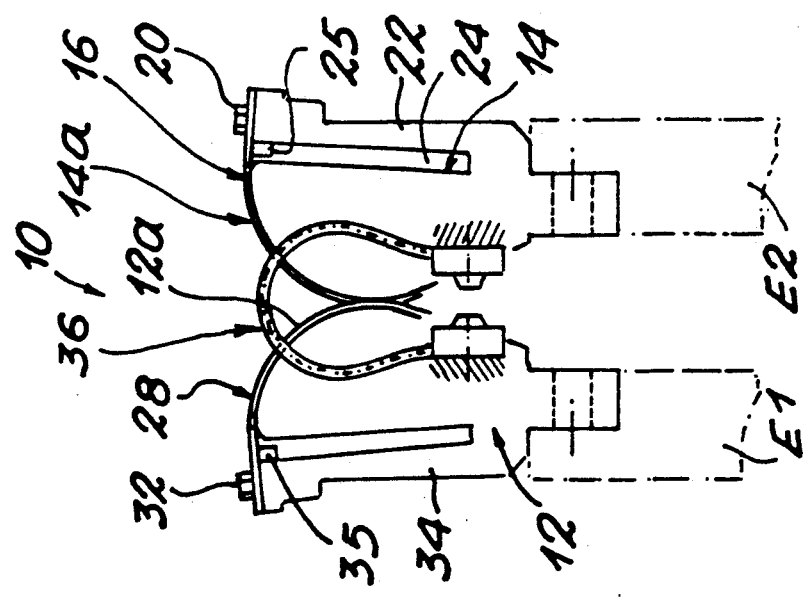

As shown more specifically on FIG. 3a, the end opposite each of the winding plates 16 is fixed by screws 20 to one end of a bending beam 22 whose other end is integral with the brace 14. In the example represented, the beam 22 is embodied from a single part with the brace 14. The beam 22 is then obtained by machining an aperture 24 in the mass of the brace 14 at the end of the cylindrical surface 14a and along a radial direction with respect to this surface.

At the time of assembling, a force is exerted on the end of the beam 22 to which the winding plate is to be secured, thus resulting in an elastic deformation of the beam towards the brace 14. This force is maintained until the plate 16 has been fully secured to the beam 22 by screws 20. The force is then released, which has the effect of applying to the plate 16 a traction prestressing whose value may be known accurately according to the deflection measured on the beam 22.

In certain applications, especially in spatial applications, the beam 22 is subjected to loads which risk deforming it beyond its limit of elasticity, which would then have the effect of suppressing or reducing the prestressing applied by this beam on the corresponding winding plate 16. In order to avoid this occurring, a shim 25 (FIG. 3a) is preferably placed in the aperture 24 between the end of the beam 22, to which the plate 16 is secured, and the surface opposite the brace 14. However, this shim 25 allows for a certain amount of play sufficient to ensure the prestressing remains applied to the plate.

In the embodiment represented on FIGS. 1 to 3, the joint 10 includes two other external winding or control plates 28 which are secured to the outer sections of the braces 12 and 14 close to each of the plates 16, so as to be also symmetrical with respect to the median plane of the braces. These winding plates 28 are wound in the opposite direction of the plates 16 on the braces so that the plates 16 and 28 cross between the cylindrical surfaces 12a and 14a. The mounting of the winding plates 28 on the braces, also similar to that of the plates 16, is thus inverse with respect to the latter.

By way of example, one end of each of the plates 28 is secured directly by screws 30 to an outer flat surface of the brace 14 extending the cylindrical surface 14a tangentially to said brace. The other end of each of the winding plates 28 is secured by screws 32 to a first end of a flexion beam 34 whose other end is integral with the brace 12 and preferably embodied all in one piece with the latter (FIG. 3a). A traction prestressing is applied to the assembly on each of the winding plates 28 with the aid of beams 32, as described previously for the winding plates 16. Shims 35 also prevent any deformation of the beams 32 beyond their limit of elasticity.

The assembly formed by the braces 12 and 14 and by the traction prestressed winding plates 16 and 28 forms an antifriction joint. The prestressings stored in each of the winding plates (whose value may reach about 800N) make it possible to prevent the appearance of any radial play or stray movements, such as torsional movements between the braces, especially at the time of deployment, despite the differential expansions and impacts to which the joint may be subjected, especially when used in spatial applications.

In accordance with the invention, the joint 10 in addition includes preformed elastic bands 36 whose function is to both ensure the automatic deployment of the joint and its locking in the deployed position. To this effect, the ends of each of the elastic bands 36 are secured to the braces 12 and 14.

More specifically, the ends of each of the elastic bands 36 are secured to anchorage parts 38, for example by means of screws 37 pressing the ends of the bands 36 between a holding washer 39 and the anchorage part 38 (FIGS. 4 and 5). The anchorage parts 38 are themselves mounted, for example, by detachable fixing means, such as screws 41, onto the lateral faces of the braces 12 and 14. In the embodiment represented, an elastic band 36 is thus mounted on each side of the braces 12 and 14, as shown on FIGS. 1, 2 and 4.

As illustrated in particular on FIG. 5, each of the elastic bands 36 is itself constituted by two identical superimposed spring rods having an arc of a circle-shaped section. In the rest position, these spring rods normally occupy a rectilinear position. The joint 10 is then in the deployed position. The fixing of the elastic bands 36 onto the anchorage parts 38 is such that, in this position, these bands are distanced from the plane passing through the axes of the cylindrical surfaces 12a and 14a by a positive distance d (FIG. 5) and the concavity of the plates is orientated towards this plane. The value of the distance d is selected according to the envisaged application so as to obtain the best possible compromise between the drive torque controlling deployment, the unblocking torque determining the effectiveness of locking and the rigidity of the joint in the deployed position. For example, if the radius of the cylindrical surfaces 12a and 14a is 22 mm, the distance d may be about 15 mm.

Advantageously, each of the elastic bands 36 is covered with a thermally insulating protection casing 42 (FIGS. 1 and 2) where the joint is used in a spatial application. This protection makes it possible to ensure that the behavior of the elastic bands is not modified by the differential expansions induced by the high thermal gradients to which the joint is subjected in this application (the temperature of the joint able to vary between about 180° C. and about −120° C. when the satellite is in orbit).

As also shown on FIG. 5, the superimposed spring rods 40 forming each of the elastic bands 36 are preferably rendered integral at their middle by a rivet 44 or by any other mechanical linking device not modifying the behavior of these spring rods. Tests have shown that such a rivet has made it possible to guarantee perfect symmetry between the two halves of the plates. A smooth evolution of the drive torque exerted by the spring rods on the joint is thus obtained, resulting in a smooth deployment of said joint, which is not always the case when a rivet is not used.

The addition of the elastic bands 36 to the assembly constituted by the braces 12 and 14 and the winding plates 16 and 28 makes it possible to embody an antifriction self-motorized joint, itself ensuring its locking in the deployed position. In particular, it is important to mention that the embodiment of each of the elastic bands 36 by means of two superimposed spring rods 40 makes it possible, for a given spatial requirement, to obtain a drive torque and unblocking torque greater than those which would be obtained with a thicker single rod. In fact, tests have shown that the drive torque obtained with the aid of two superimposed spring rods of a given thickness is more than twice the drive torque obtained with the aid of a single spring rod of the same thickness throughout the period of deployment, this phenomenon being all the more significant when the angle of deployment of the joint is small. These same tests have also shown that the phenomenon is that much more significant whent the thickness of the spring rods increases. This is therefore particularly advantageous when, according to the invention, it is desired to obtain the best possible distributed drive torque according to the angles of deployment by using at least two superimposed spring rods.

Various phases for the deployment of a joint 10 thus constituted are illustrated on FIGS. 3a to 3c.

FIG. 3a represents the joint in its initial folded back position. The holding in this position of the elements connected by the joint is ensured by any external device, such as an explosive bolt, which does not form part of the invention. In this position, the plates 16 are virtually fully wound onto the cylindrical surface 14a of the brace 14, whereas the plates 28 are virtually fully wound onto the cylindrical surface 12a of the brace 12. Furthermore, the spring rods constituting the bands 36 are curved inwards so as to form a loop.

Once the aforesaid holding device is released, the stressing stored in the elastic bands 36 exerts on the braces 12 and 14 a drive torque Cm (FIG. 3b) which has the effect of causing the cylindrical surfaces 12a and 14a of these braces to roll onto each other. The winding plates 16 are thus progressively wound onto the cylindrical surface 12a while unwinding from the cylindrical surface 14a, whereas the winding plates 28 are wound onto the cylindrical surface 14a while unwinding from the cylindrical surface 12a. This situation is illustated by FIG. 3b.

FIG. 3c represents the end of deployment situation in which the elastic bands 36 are perfectly rectilinear and ensure locking of the joint in this position. The winding plates 16 are then virtually fully wound onto the cylindrical surface 12a, whereas the winding plates 28 are virtually fully wound onto the cylindrical surface 14a.

Throughout deployment, it is important to mention that the traction prestressed winding plates 16 and 28 ensure accurate guiding and rolling of the braces onto each other without friction occurring and without any radial play or stray movement, such as a torsional movement, possibly occurring between these braces. The propulsion of the joint may thus be relatively slight, which is not the case with existing joints used in particular in spatial applications. Thus, it is possible to use any deployment adjustment speed system normally making it possible to limit the end of deployment impacts of the various elements of an articulated assembly, such as a satellite solar panel.

When the joint 10 according to the invention is in the deployed position, its rigidity presents different characteristics depending on whether or not it is subjected to a torque applied as regards its opening or closing.

Thus, when the deployed joint is subjected to a torque acting on opening (arrow Co on FIG. 3c), the relative fitting between the elastic bands 36 and the braces 12 and 14 ensures that the latter tend to be applied against each other when the bands are subjected to a tractive force. The rigidity of the joint is then sufficiently high so as to be satisfactory in all the envisaged applications.

On the other hand, when the joint deployed is subjected to a torque applied on closing (arrow Cf on FIG. 3c), the elastic bands 36 work on compression and a tractive force is applied in the winding plates 16 and 28. The rigidity of the joint is then significantly less than the rigidity it has when subjected to a torque applied on opening. When the torque applied is too great, this low rigidity causes the braces 12 and 14 to move apart.

In a large number of applications, the relatively poor rigidity exhibited by the joint as regards closing is completely tolerable. However, in certain applications, it is necessary to add to the joint an additional device making it possible to increase its rigidity as regards closing when it is in the deployed position.

In the embodiment represented on FIGS. 1 to 5, this additional device is constituted by flexible linking members, such as twisted metal cables 46 whose ends are respectively secured to the braces 12 and 14 so as to be tension prestressed when the joint 10 is in the deployed position.

More specifically, the joint represented includes two cables 46 disposed on both sides of the braces 12 and 14 on the other side of the elastic bands 36. The ends of each of the cables 46 are secured to a square-shaped support 48, itself secured to one of the anchorage parts 38, as shown in detail on FIG. 4.

The securing of each end of the cables 46 to the corresponding support 48 is carried out by means of a threaded joining piece 49 screwed into the support and kept in place by a counternut 50. The tension of each of the cables 46 is adjusted in the deployed position by screwing one of the joining pieces 49 into a sleeve 51 linked to the corresponding end of the cable 46 so as to crush the Belleville washers 53 against the support 48. Prestressing is automatically applied to the cable once the joint is deployed.

Preferably, when the joint has to be subjected to extremely high temperature gradients, this especially being the case in spatial applications, the fixing of the supports 48 to the anchorage parts 38 is effected so that the expansions resulting from this have no effect on the prestressing stored in the cables 46.

As illustrated on FIG. 4, this result can be obtained by a special mounting of the supports 48 on the anchorage parts 38. In this assembly, each of the supports 48 comprises a slug 48a which penetrates into an additional inside recess formed in the anchorage part 38. A tightly screwed fastening screw 52 traverses the support 48 and the anchorage part 38 according to the axis of the slug 48a. Each support 48 is also secured to the corresponding anchorage part 38 by a second screw 54, screwed less tightly and traversing the support 48 with a certain amount of play.

In the fitting thus embodied, the ends of the cable 46 secured to the supports 48 are separated by a distance do, whereas the axes of the fastening screws 52 of the supports 48 on the anchorage parts 38 are separated by a distance d1. Moreover, the supports 48 are made of a material, such as Invar (registered trade mark), whose expansion coefficient is virtually nil.

Furthermore, the expansion coefficient 1 of the material, such as a metal or metal alloy, in which the anchorage parts 38 and the braces 12 and 14 are known, this equally being the case with the expansion coefficient o of a material, such as steel, in which the cable is embodied. Thus, by giving the previously defined distances do and d1 values so that do o=d1 1, such an assembly makes it possible to suppress the differential expansions between the cables and the braces so that the tensional prestressing stored in the cables remains unchanged, regardless of the temperature.

The disposition of the cables 46 with respect to the plane passing through the axes of the cylindrical surfaces 12a and 14a of the braces when the joint is in the deployed position is such that these cables are located approximately inside this plane or offset from the side of the elastic bands 36 with respect to this plane. This disposition makes it possible to only tension the cables 46 once the joint has been deployed and thus ensures that the resistant torque exerted by this cable does not prevent full deployment of the joint. This disposition, however, enables the cables 46 to significantly increase the rigidity of the deployed joint, especially as regards closing, and prevents the braces 12 and 14 from moving apart when a torque is applied to the deployed joint on application of a closing force.

Figure 6:
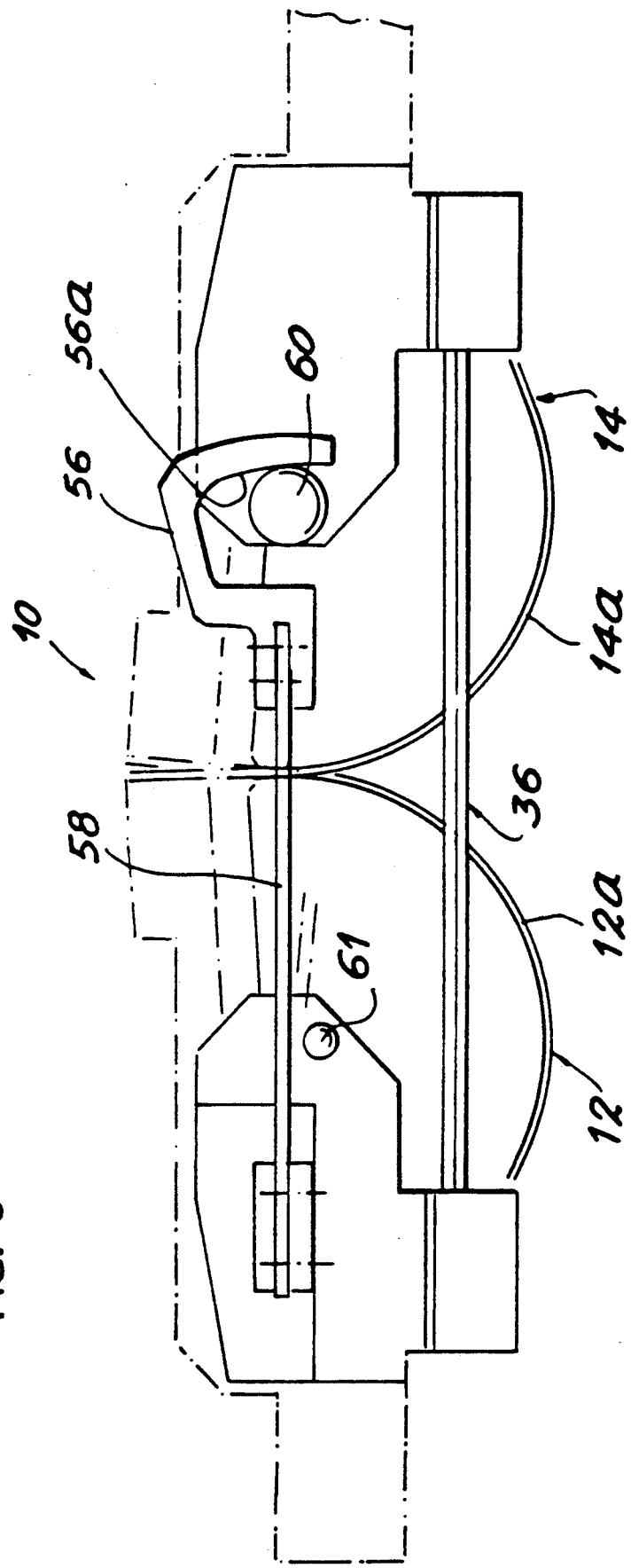
FIG. 6 is a side view illustrating an embodiment variant of the joint of FIGS. 1 to 5.

FIG. 6 illustrates an embodiment variant in which the rigidity in the deployed position is improved, no longer by the cables, but by additional hooking devices linked to each of the braces and which fit together once the joint is deployed. A set of additional hooking devices may also be fixed to the braces 12 and 14 on both sides of said braces on the other side of the elastic bands 36.

More precisely, FIG. 6 shows that each assembly of additional hooking devices includes a hook 56 fixed to one end of a flexible spring rod 58 whose other end is secured to one of the braces, for example the brace 12. The other hooking device is constituted by a slug 60 integral with the other brace, for example the brace 14. The fixings of the flexible spring rod 58 on the brace 12 and the slug 60 on the brace are effected in such a way that, when the hook 56 is engaged on the slug 60 with the joint being in the deployed position, the rod and the axis of the slug 60 are disposed approximately within the plane passing through the axes of the cylindrical surfaces 12a and 14a of the braces in the same way as the cables 46 in the first embodiment variant.

Moreover, the elasticity of the spring rod 58 tends to cause the latter to pivot around its end secured to the brace 12 beyond the aforesaid position towards the fitting of the hook 56 on the slug 60 as far as a stop 61 secured to the brace 12.

In this way, once the joint has been deployed, the slug 60 penetrates into the hook 56 by coming into contact with a slanted internal edge 56a of the outer arm of the hook 56. The slant of the edge 56a is determined so that the slug 60 comes into contact in all temperature conditions, despite the differential expansions resulting from these. In particular, the elasticity of the spring rod 58 makes it possible to fit the hook 56 more deeply into the slug 60 when required by differential expansion.

On the other hand, the materials constituting the hook and the slug are selected so that, when a tractive force tending to distance the braces from each other is applied to the deployed joint, this force is fully taken up by the support of the slug 60 on the slanted edge 56a of the hook without any sliding able to occur between these devices.

This second embodiment variant of the invention thus makes it possible as previously to ensure rigidity of the joint in the deployed position, especially when the latter is subjected to a torque applied on closing. However, contrary to the case with the prestressed cables of the first embodiment variant, the assembly constituted by the spring rods 58, the hooks 56 and the slugs 60 is not prestressed, so that the rigidity of the joint is obtained without the braces possibly moving away from each other when this joint is subjected to a significant torque on closing.

The two solutions just described to improve the rigidity of the joint 10 when found in the deployed position and when it is subjected to a torque upon closing require that the winding plates and elastic bands of the additional devices be added to the basic joint constituted by the braces. In the embodiment variant represented on FIGS. 7 and 8, a comparable result is obtained without adding any device to the basic joint.

In this embodiment variant, instead of directly being wound onto the outer cylindrical surfaces 12a and 14a of the braces, the winding plates 16 and 28 are housed in throats 12b and 14b formed on these surfaces. In this way, instead of crossing inside the plane tangent to the cylindrical surfaces 12a and 14a, the winding plates 16 and 28 cross by forming with this common tangent plane a positive angle $\theta$. The value of this angle $\theta$ is determined by the depth of the throats 12b and 14b, said depth needing to be greater than the thickness of the plates 16 and 28.

Having regard to the existence of this angle $\theta$, the tensional prestressing applied to each of the plates 16 and 28 creates, at the point of contact between the surfaces 12a and 14a of the braces, a component perpendicular to these surfaces and tending to apply the braces against each other. Thus, it is possible, by giving this angle $\theta$ a suitable value, to increase the rigidity of the joint in the deployed position. In fact, a given maximum closing torque able to be borne by the joint is then set against a force for plating the braces against each other balancing at least this torque.

By way of example in no way restrictive, the angle $\theta$ may have a value of about 15° in the case of a joint comprising four winding plates being required to resist a torque of 8 Nm when the elastic bands 36 are spaced by about 15 mm from the plane passing through the centers of the cylindrical surfaces 12a and 14a of the braces. For cylindrical surfaces having a radius of 22 mm, this angle $\theta$ corresponds to throats 12b and 14b whose depth is about 0.9 mm.

In this embodiment variant illustrated by FIGS. 7 and 8, instead of being effected by means of the winding plates 16 and 28, the contact between the braces is effected directly by the cylindrical surfaces 12a and 14a on both sides of the throats 12b and 14b. So as to ensure correct taking up of the forces between the braces, a slight increase of the spacing between the winding plates is thus required.

The antifriction joint according to the invention, whose three embodiment variants have just been successively described with reference to FIGS. 1 to 8, possesses the characteristics of reliability, rigidity and mechanical behavior which, if required, make it possible to join onto each other two adjacent elements by means of a single joint of this type. This makes it possible to simplify assembling since the presence of several joints between two adjacent elements poses problems of alignment, often difficult to resolve having regard to production tolerances.

A further main advantage of the joint according to the invention, already mentioned earlier, concerns the fact that the quality of the guiding ensured by the prestressed winding plates, at the time of rolling of the braces onto each other controlled by the elastic bands as well as the absence of friction of the joint, makes it possible to accurately modelize the behavior of the joint at the time it is deployed. Thus, it is not generally necessary to adjust its deployment speed or to equip an articulated assembly constituted by several successive elements connected by such joints with an additional synchronization mechanism.

In certain applications, it may, however, prove useful to equip such an articulated assembly with a synchronization mechanism. In this case, a mechanism is preferably used, such as the one diagrammatically illustrated on FIGS. 9 to 11.

These figures show three successive articulated elements E1, E2 and E3 joined together two-by-two by means of joints 10a and 10b according to the invention. These articulated elements, whose number may possibly be more than three, may in particular be the elements of a satellite solar panel.

As illustrated on FIG. 9, the synchronization mechanism equipping the articulated assembly firstly includes a support 70a, 70b connected to each of the joints 10a and 10b. Each of these supports roughly has the shape of a U whose top is orientated towards the inside of the corresponding joint.

The branches of the V formed by each of the supports 70a, 70b are joined at their middle onto the panels E1, E2 and E2, E3 connected by the corresponding joints 10a, 10b. Thus, the branches of the support 70a are respectively joined onto the panels E1 and E2 through axes 72a1 and 72a2 and the branches of the support 70b are joined onto the panels E2 and E3 through axes 72b2 and 72b3. More specifically, the axes 72a1 and 72a2 are respectively merged with the axes of the cylindrical surfaces of the braces of the joint 10a respectively linked to the element E1 and the element E2. Similarly, the axes 72b2 and 72b3 are merged with the axes of the cylindrical surfaces of the braces of the joint 10b and are respectively linked to the elements E2 and E3. In practice, instead of being joined onto the elements E1, E2 and E3, the supports 70a and 70b can be directly joined onto the braces of the joints connecting these elements.

The synchronized deployment mechanism illustrated on FIGS. 9 to 11 also includes traction devices, such as cables or rods connecting the supports 70a and 70b joined onto a given element, such as the element E2 on the Figures.

Thus, as regards the element E2, two traction devices 74ab1 and 74ab2 are joined via their two ends respectively onto the branches of the supports 70a and 70b joined onto this element E2 on both sides of the axes 72a2 and 72b2 and at an equal distance from the latter so as to form a deformable parallelogram with said branches of the supports. Similar traction devices fitted in the same way are connected to the other elements, such as E1 and E3 of the panel. These traction devices are respectively denoted by the references 74a1 and 74a2 for the element E1 and by 74b1 and 74b2 for the element E3.

By virtue of this disposition and illustrated on FIGS. 9, 10 and 11 at various stages for deployment, this deployment of the various elements constituting the articulated assembly is effected perfectly synchronized.

Thus, in the initial position illustrated by FIG. 9 in which the elements E1, E2 and E3 are parallel to each other and folded against each other, the traction devices 74 are also all parallel to these elements and the supports 70a and 70b are disposed symmetrically with respect to the planes tangent to the contact points between the cylindrical surfaces of the braces of the corresponding joints 10a and 10b.

When the device (not shown) locking the articulated assembly in its folded back position is freed, the drive torque stored in the elastic bands of the joints automatically ensures the deployment of the various elements, such as E1, E2 and E3. However, owing to the presence of deformable parallelograms formed by the traction devices 74 and the supports 70, for any value $\beta$ of the angle of deployment of any one of the joints, such as the joint 10a, the angle of deployment of the other joints, such as the joint 10b on FIG. 10, has this same value $\beta$.

The complete deployment of the various elements of the articulated assembly, illustrated on FIG. 11, is thus simultaneously obtained for each of the joints, such as the joints 10a and 10b of this assembly.

Of course, the invention is not restricted to the various embodiment variants previously described by way of examples.

Thus, the number of winding plates may differ from four, provided there exists at least one winding plate similar to the plates 16 and 28. Similarly, the means to exert on these plates a traction prestressing may differ from the means described. In particular, these winding plates may be replaced by flexible non-expandable devices, such as cables, on which prestressing may be applied by means of compressed Belleville washers.

The number of elastic bands may also differ from two when the drive and unblocking torques desired to be obtained justify this number. In addition, although each of the elastic bands is preferably constituted by two superimposed plates as described previously, it is possible to use more or less than two plates.

Furthermore, it ought to be mentioned that the use of means, such as prestressed cables, hooks or throats to increase the rigidity of the joint, is optional. The same applies to the synchronized deployment mechanism described with reference to FIGS. 9 to 11.

Finally, the supports 48 of the linking devices 46 may be made of a material having a positive expansion coefficient 2. The distances do and d1 shall then be selected so as to satisfy the equation: $do\alpha o = d1\alpha 1 + (do - d1)\alpha 2$.

What is claimed is:

1. Antifriction joint designed to be mounted between two adjacent elements and comprising at least one preformed elastic band having a circular arc-shaped cross section and having two ends of which one is secured to each of said elements, said joint also comprising two braces suitable for being rendered integral with each of the elements and on which secured are the respective ends of each elastic band, said braces comprising convex cylindrical surfaces suitable for rolling onto each other under the action of at least two flexible members, the two ends of each of these members being respectively secured to each of the braces so that these members pass by crossing between said cylindrical surfaces, a tensioning device being provided for exerting a tractive prestressing on each of said members, said elastic band including two superimposed spring rods rendered integral at their middle by a mechanical linking device.

2. Joint according to claim 1, wherein each elastic band is disposed at a positive distance from a plane passing through the axes of the cylindrical surfaces parallel to this plane and from the side orientated towards the inside of the joint.

3. Joint according to claim 1, wherein each elastic band is covered with a thermally insulating protection casing.

4. Joint according to claim 2, wherein each brace comprises two opposing lateral faces, the end of at least one elastic band being secured to at least one of said faces by means of an anchorage part.

5. Joint according to claim 4, wherein the anchorage parts are mounted on the braces by detachable fixing means.

6. Joint according to claim 2, wherein each flexible member is mounted in throats formed in said cylindrical surfaces whose depth is more than the thickness of said member, so that the cylindrical surfaces are directly in contact with each other on both sides of said throats.

7. Joint according to claim 4, wherein each flexible member is a winding plate.

8. Joint according to claim 2, wherein said joint includes four flexible members comprising two adjacent central members wound in a given first direction on said cylindrical surfaces and two outer members adjacent to the central members and wound in a given second direction opposite the first direction on said cylindrical surfaces.

9. Joint according to claim 2, wherein said joint moreover includes complementary hooking members respectively secured to each of the braces so that these members are fitted together close to an open position of the joint so as to be opposite a spacing of the braces in this position.

10. Joint according to claim 9, wherein the additional hooking members include a hook connected to one of the braces by a spring rod approximately contained within a plane joining the axes of the cylindrical surfaces, and a slug integral with the other brace and suitable for penetrating the hook so as to take support on a slanted edge of this hook in the open position of the joint.

11. Joint according to claim 1, wherein said tensioning device includes a bending beam, a first end of said bending beam being integral with one of the braces and the other end of said bending beam being secured to one end of said flexible members.

12. Joint according to claim 11, wherein a shim is inserted between the end of the beam to which said device is secured and an adjacent face of the brace bearing this beam.

13. Joint according to claim 1, wherein said joint also includes at least one linking member whose ends are respectively secured to each of the braces, this linking member being tensioned immediately close to an open position of the joint so as to exert a force tending to apply said cylindrical surfaces onto each other in this open position.

14. Joint according to claim 13, wherein each linking member is a cable.

15. Joint according to claim 13, wherein each linking member is disposed roughly within a plane passing through the axes of the cylindrical surfaces when the joint is deployed.

16. Joint according to claim 13, wherein each linking member is prestressed when the joint is in the open position.

17. Joint according to claim 13, wherein said joint includes two linking members, the ends of each of these linking members being secured via a support to each of the anchorage parts.

18. Joint according to claim 17, wherein the supports comprise fixing zones on the anchorage parts having between them a distance d1 corresponding to a distance do between the ends of the linking member secured to these supports in the open position of the joint, these distances d1 and do being such that $do\alpha o = d1\alpha 1 + (do - d1)\alpha 2$, where $\alpha o$, $\alpha 1$ and $\alpha 2$ respectively denote the expansion coefficients of the materials constituting the linking member, the anchorage parts, the braces and the supports.

19. Articulated assembly formed of at least three adjacent elements joined two-by-two by at least one antifriction joint comprising at least one preformed elastic band having a circular arc-shaped cross section and having two ends of which one is secured to each of said elements, said joint also comprising two braces suitable for being rendered integral with each of the elements and on which secured are the respective ends of each elastic band, said braces comprising convex cylindrical surfaces suitable for rolling onto each other under the action of at least two flexible members, the two ends of each of these members being respectively secured to each of the braces so that these members pass by crossing between said cylindrical surfaces, a tensioning device being provided for exerting a tractive prestressing on each of said members, said assembly also including a synchronized deployment mechanism comprising, between each pair of adjacent elements, a support joined onto these elements through axes merged with the axes of the cylindrical surfaces of the joint connecting these elements and, for each element, a pair of traction members joined onto the supports on both sides of their hinge pins on this element so as to form deformable parallelograms with these supports.

20. Articulated assembly according to claim 19, wherein the supports comprise two right-angled branches open to the outside of the corresponding joints.

21. Articulated assembly according to claim 19, wherein the traction members are cables.

22. Articulated assembly according to claim 19, wherein the traction members are rods.

* * * * *